April 12, 1927.  
E. B. PAYNE  
1,624,560
INDUCTANCE COIL AND METHOD OF MANUFACTURING THE SAME
Filed Nov. 14, 1924
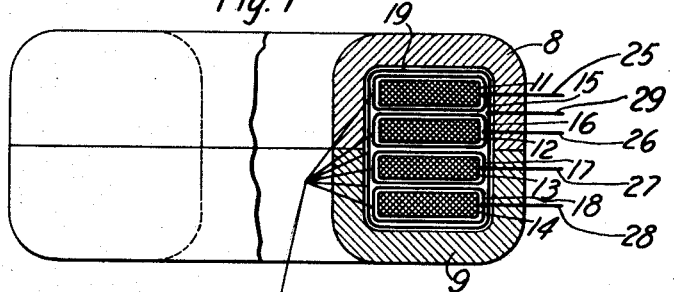
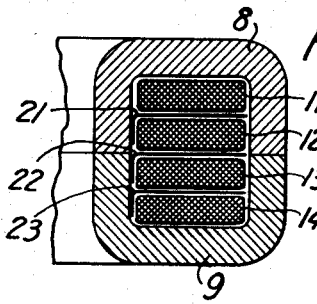
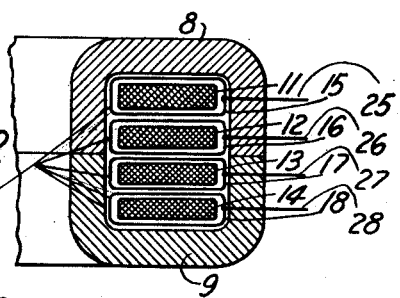
Shields insulated from each other and from core.
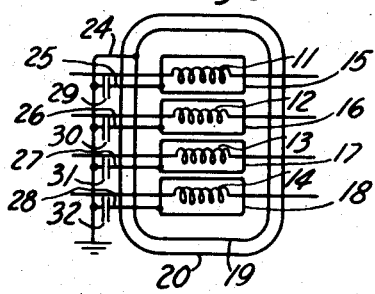
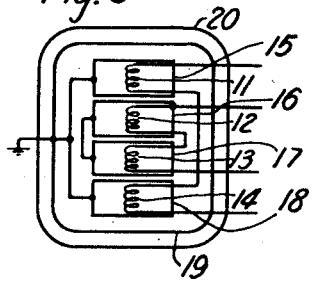
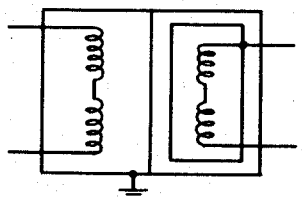
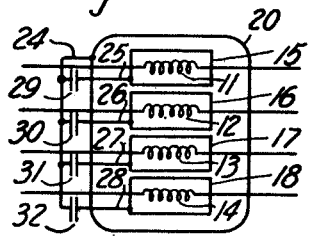
Inventor:
Edward B. Payne,
by E. W. Adams Atty Patented Apr. 12, 1927.

1,624,560

UNITED STATES PATENT OFFICE.

EDWARD B. PAYNE, OF GREAT NECK, NEW YORK, ASSIGNOR TO WESTERN ELECTRIC COMPANY, INCORPORATED, OF NEW YORK, N. Y., A CORPORATION OF NEW YORK.

INDUCTANCE COIL AND METHOD OF MANUFACTURING THE SAME.

Application filed November 14, 1924. Serial No. 749,818.

This invention relates to inductance devices and particularly loading coils of the so-called iron-clad type.

One object of this invention is to provide a simple and effective method of, and means for, shielding the coils of iron-clad inductance devices.

Another object of this invention is to reduce the cross talk between circuits loaded with iron-clad phantom circuit loading coils by providing a cheap and efficient method of balancing the capacities of the windings.

In phantom circuit loading, it is usually the practice to provide a loading coil having four windings adapted to be connected to the two pairs of line conductors and so arranged on a common magnetic core as to introduce inductance into the phantom circuit. Slight irregularities in the manufacture of the coils are likely to produce capacity unbalance of such order as to cause objectionable cross talk, particularly cross talk between the phantom and side circuits. This can be produced by unsymmetrical capacities between the coils or between the coils and some common point as the core or ground.

In accordance with one feature of this invention, coils of an iron-clad core are shielded by being wound with copper tape or tinfoil before being mounted in the core. In some cases, it is desirable not only to shield the individual coils but also to shield a group of coils so that the capacity between the coils and a common point can be better controlled. This method of shielding when employed with phantom circuit loading coils, brings about to a large extent a natural capacity balance between the coils. However the shielding so concentrates the capacity that any slight irregularities may be compensated for by connecting artificial capacities between the shields.

The invention can be more readily understood by reference to the following detailed description in connection with the drawing in which:

Fig. 1 represents one embodiment of this invention in an inductance coil shown partly in section; Figs. 2 and 5 represent partial sections of modified forms of the invention; Figs. 3 and 4 show schematically the method of balancing the capacities in the modification shown in Figs. 1 and 2 respectively; Fig. 6 shows schematically the method of connecting the coils and shields when the device is used as a bridge transformer; and Fig. 7 is the equivalent of Fig. 6.

Referring to Fig. 1 an iron-clad inductance coil is shown of the general type described in the copending application of W. J. Shackelton Serial No. 471,371, filed May 21, 1921, comprising two blocks 8 and 9 composed of appropriate magnetic material, such as molded iron dust core material. Each block is provided with a groove in which the windings 11, 12, 13 and 14 are mounted. In accordance with this invention, the individual windings are shielded by means of the metallic shields 15, 16, 17 and 18 which comprise copper tape or tinfoil which is wrapped around the coils before they are assembled in the core. In order to prevent these shields from acting as short circuited turns in the windings, the tape must be supplied with gaps. These may be provided by making the shields of interrupted tape or spiral insulated shielding comprising conducting and insulating tape. The shielded coils are insulated from one another by being wrapped with insulating material such as paper or thin fabric. In the drawing this insulating material is represented by a space between the shields. After being shielded and insulated, the coils are grouped together and a shield 19 wrapped around the whole group. This shield is separated from the core by a layer of insulating material which may be wrapped around the group of coils in the same way as the insulating material was wrapped around the individual coils.

Fig. 2 shows a modification of Fig. 1 in which the outer shield 19 is omitted, the shielded and insulated coils being mounted directly in the core slots.

Fig. 3 shows a method of adjusting the capacities between the windings when the device of Fig. 1 is employed as a phantom circuit loading coil. By connecting each shield to one point of its winding it is possible to concentrate the capacities between the shields rather than between portions of the coils, so that the capacities between the coils and a common point may be adjusted to get a capacity balance which will produce no cross talk. For this reason, connections from the shields are brought out. These are shown in Fig. 1 as the wires 25, 26, 27, 28 and 29. However, it is often unnecessary to directly connect the shields and the coils, since the capacity between each coil and its shield is largely confined between the shield and the outer layer of the coil which in most cases is a small portion of the whole coil, so that practically the same result is effected as though the shield were connected to the coil at one point.

In the arrangement shown in Fig. 3 the outer shield 19 is grounded by having its connecting wire 24 connected to ground. The capacity between the other shields 15, 16, 17 and 18 and the outer shield can be very readily measured and by connecting small condensers 29, 30, 31 and 32 in parallel with the natural capacity between the shields, it is possible to adjust those capacities to a ratio which will produce no cross talk.

Fig. 4 shows diagrammatically a method of adjusting the capacities of the form shown in Fig. 2. The line 20 represents the core slot. In this case a capacity balance is maintained between the windings and the core, rather than between the windings and ground. This is the preferred form since in this case the outer shield can be eliminated and a greater insulation between the windings and ground secured by insulating the core from ground. It is also possible to more easily obtain a capacity balance which will produce no cross talk. In this case the adjustment capacities may comprise small pieces of tape or tinfoil insulated from the core.

Fig. 5 shows an embodiment of the invention in which the coils are not completely shielded, but instead are separated by metallic strips 21, 22 and 23 placed between the coils and attached to the core. By connecting the coils 12 and 14 to one pair of conductors and the coils 11 and 13 to another pair it is possible to get a very close capacity balance with this arrangement without the use of the more expensive complete shield.

While this invention is particularly related to loading coils, it is obvious that the shielded coils herein described may be employed for many other purposes. For example, Fig. 6 shows diagrammatically one method of connecting the windings and shield to form a shielded bridge transformer. In this case, the windings 11 and 14 are connected together to form one winding of the transformer, their associated shields 15 and 18 being connected to the main shield 19 and ground. The other two windings are connected together to form the other transformer winding, their shields being connected together and to one of their terminals. The resultant transformer is equivalent to the usual type of shielded bridge transformers shown in Fig. 7.

What is claimed is:

1. An inductance device comprising a plurality of windings, a core comprising a shell of magnetic material surrounding and enclosing said windings, and individual electrostatic shielding means for said windings comprising an interrupted metallic shield substantially completely surrounding each of said windings.

2. An inductance device comprising a plurality of windings, a core of magnetic material surrounding and enclosing said windings, individual electrostatic shielding means for said windings comprising a metallic shield surrounding each winding, and means for controlling the electrostatic potentials of said shields.

3. An inductance device comprising a plurality of annular winding units, a core having an annular channel for enclosing said windings, an individual metallic shield surrounding each winding unit, insulating means between said shields, and electrical connections between said shields for controlling the electrostatic potentials thereof.

4. An inductance device comprising a stack of flat annular winding units, a common magnetic core member containing an annular channel enclosing said stack of winding units, individual metallic shields surrounding said winding units, electrical connections from said shields to said core member, and adjusting capacities in said connections.

5. A phantom circuit loading coil comprising four annular side circuit windings, a common magnetic core therefor comprising magnetic material having an annular channel surrounding and enclosing said windings, individual electrostatic shielding means for said windings comprising an interrupted metallic shield surrounding each winding, and connections between said shields containing balancing capacities such that the capacities between the several windings of the side circuits produce an electrostatic balance as respects cross-talk potentials.

In witness whereof, I hereunto subscribe my name this 31st day of October A. D., 1924.

EDWARD B. PAYNE.